Feb. 10, 1959 G. P. DENNIS 2,873,383
MEANS FOR GENERATING PULSATING DIRECT CURRENTS
Filed July 13, 1956
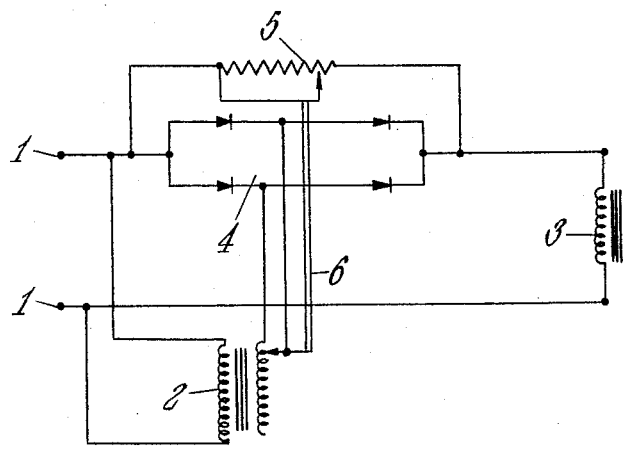
Inventor
G. P. Dennis
By Glascock Downing Seebold
Attys.

United States Patent Office 2,873,383
Patented Feb. 10, 1959

2,873,383

MEANS FOR GENERATING PULSATING DIRECT CURRENTS

George Pollard Dennis, Liverpool, England, assignor to Lockers (Engineers) Limited Application July 13, 1956, Serial No. 597,729

1 Claim. (Cl. 307—1)

This invention relates to means for generating pulsating direct currents as are required for operating electrically vibrated machines such as feeders and screens, or like machines which are vibrated by such currents.

Arrangements for this purpose are known in which direct current is supplied through a rectifier bridge connected between an A. C. supply and the output, with a resistance connected in parallel with the rectifier bridge, a transformer being connected to the A. C. supply and having a secondary winding with variable tappings connected across the rectifier bridge. This arrangement allows the output to be increased or decreased only in steps and not continuously, and also does not allow zero or outputs much less than one third of the full power to be obtained.

According to the present invention, the said resistance is made variable, and the transformer is made continuously variable, the resistance and transformer being mechanically coupled in such a manner that when the resistance is short-circuited the transformer does not supply any power to the rectifier.

When the resistance is short-circuited and the transformer output is zero, alternating current is supplied directly to the output, and no useful work is produced. As the transformer is brought into operation to supply power to the rectifier, the variable resistance is proportionally included in the circuit, and the rectifier is not overloaded. The amount of alternating current supplied directly to the output is progressively reduced and a progressively increasing D. C. component is superposed thereon. The amount of current flowing in one direction therefore increases as compared with the amount flowing in the other direction and the vibrating machine is enabled to produce useful work.

The invention thus enables us to obtain a smooth and practically stepless control of power to a machine which is operated by pulsating D. C. or by A. C. with D. C. superposed thereon, from zero to maximum current.

A circuits diagram of a convenient arrangement according to the invention is shown in the accompanying drawing:

Alternating current is supplied to the terminals 1, across which is connected the primary winding of a variable transformer 2. One terminal is connected directly to a vibrator machine 3, while the other is connected to the vibrator machine through a rectifier bridge 4 and a variable resistance 5 connected in parallel with the rectifier bridge 4. The secondary winding of the transformer 2 is connected across the rectifier bridge 4, and there is a mechanical coupling 6 between the adjusting means of the transformer 2, and the resistance 5, such that the resistance 5 is short-circuited when the transformer output is zero. In this position the alternating current is supplied directly to the machine 3, the rectifier bridge being shirt-circuited.

As the transformer is adjusted to increase its output, the variable resistance is proportionately included in the circuit. The amount of alternating current supplied directly through the resistance 5 is progressively reduced and a progressively increasing D. C. component is supplied through the rectifier bridge 4.

What I claim is:

Apparatus for supplying a variable alternating current with a variable direct current component superimposed thereon, comprising input terminals for connection to an A. C. supply, output terminals for connection to a load circuit, a rectifier bridge poled in one direction connected between one input terminal and the corresponding output terminal, the other input terminal being directly connected to its corresponding output terminal, a variable resistance connected between the output and input terminals in parallel with the rectifier bridge, a continuously variable transformer having its primary winding connected to the input terminals and its secondary winding connected across the rectifier bridge, and a mechanical coupling between the variable resistance and the variable transformer, such that the transformer does not supply any power to the rectifier when the resistance is short-circuited.

References Cited in the file of this patent

UNITED STATES PATENTS

| | | |
|---|---|---|
| 2,189,905 | Kalbskoff | Feb. 13, 1940 |
| 2,196,046 | Willis | Apr. 2, 1940 |
| 2,485,450 | Kotterman | Oct. 18, 1949 |